July 9, 1929.  R. H. PRATT  1,720,570
SPOT WELDER
Filed Oct. 22, 1927  2 Sheets-Sheet 1

RICHARD H. PRATT
INVENTOR.

BY Mason, Fenwick & Lawrence
ATTORNEYS.

Patented July 9, 1929.

1,720,570

UNITED STATES PATENT OFFICE.

RICHARD H. PRATT, OF PELHAM MANOR, NEW YORK.

SPOT WELDER.

Application filed October 22, 1927. Serial No. 227,992.

My invention relates to spot welding machines for all work and is in the present illustration hereof, particularly designed for welding together the ends of used metal cotton bale bands after they are cut or broken, so that they can be used again.

These bands when once used are likely to be covered with paint or rust or other foreign substance of high resistance, which prevents the low voltage current of spot welding machines from passing freely through the overlapping ends of the band to be welded together.

My invention consists primarily in combining, with the spot welding machine, a preferably metal or other abrasive motor driven brush which is revolved by the current used in operating the spot welder.

Against this brush the ends of the band to be welded together may be guided and pressed momentarily so as to thoroughly clean and remove the foreign resistant from the band ends before welding.

In the actual use of this machine, I have discovered that when the painted or corroded band ends are clamped between the electrodes without previously cleaning the ends and the motor brush is then rapidly rotated so as to vibrate the whole machine and thus the electrodes gripping the overlapping ends, this vibration produces automatically a relative frictional movement between the overlapping ends of such a nature as to of itself remove or displace the paint, rust, or other resisting material on the contacting sides of the band ends and thus make good electric contact between said ends. In nearly all cases this abrasion and electric contact is entirely adequate to produce perfect fusion between the spots on the band ends, as in only exceptional cases is it necessary to resort to the brush previously for cleaning the band ends.

So exceptional is this need of the brush, that it is optional and often preferable to dispense with the brush entirely and instead thereof use simpler means for vibrating the electrodes holding the work.

In some cases, a rotary electric motor or an electric mechanical vibrator may be arranged in vibration-communicating relation to the electrodes or work holder, or the primary and secondary coils may be arranged in loose relation to each other, so that the alternating electric impulses therein will cause the work holder and work to vibrate.

In order that my invention may be fully understood I shall first describe in detail the mode in which my invention is carried into practice and then particularly point out the invention in the claim.

Reference is to be had to the accompanying drawings forming part of this application in which like parts are designated by the same numbers in all the figures.

Figure 1:
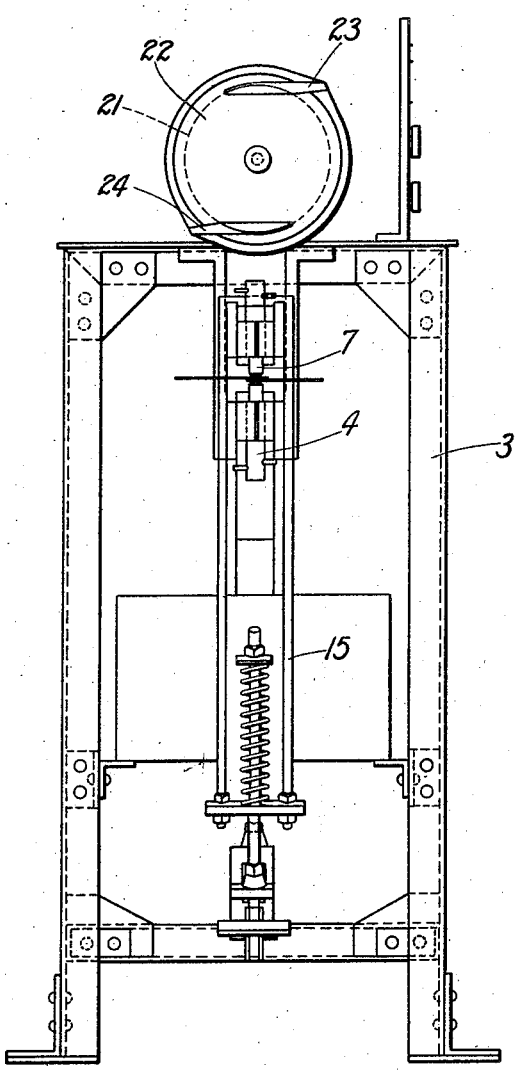
Figure 1 is a front elevation of a spot welder embodying my invention.
Figure 2:
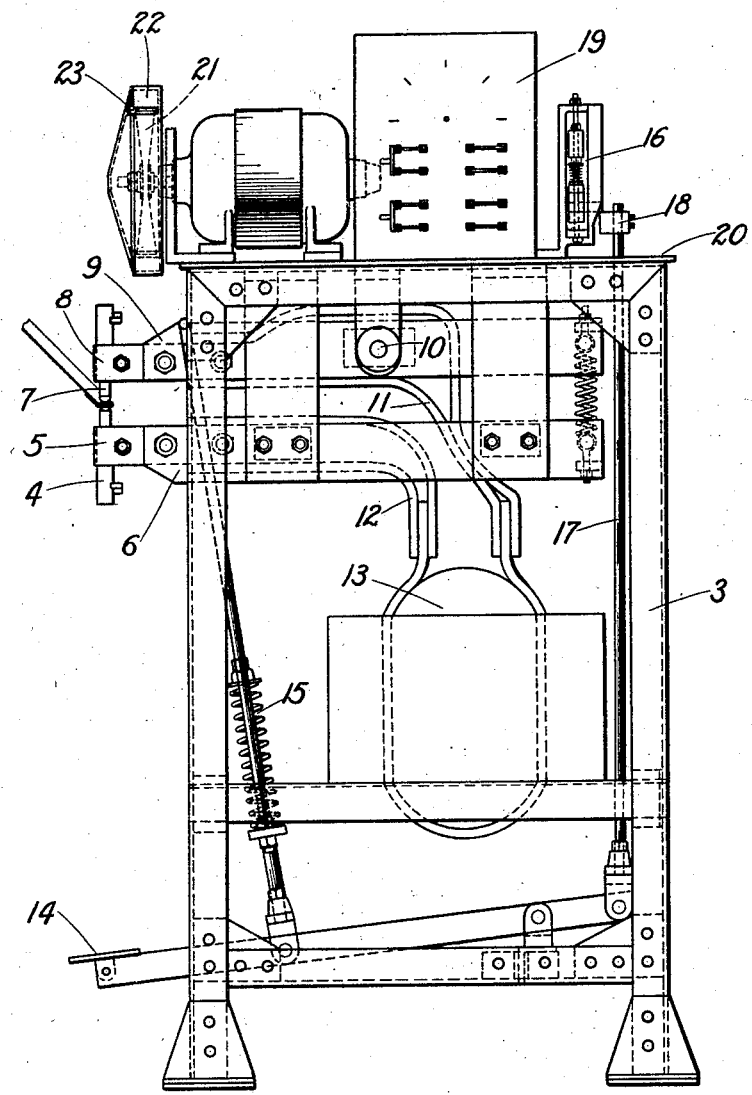
Figure 2 is a side elevation of the same.

In the particular embodiment of my invention thus illustrated 3 designates the frame of the spot welder; 4 the lower electrode held adjustably in a clamp 5 fixed to the lower jaw 6, which is fixed to the frame; 7 is the upper electrode held adjustably in a clamp 8, fixed to the upper jaw 9, which is mounted on a pivot 10 to swing vertically on the frame; 11 and 12 are the leads from the transformer 13 to the upper and lower electrodes respectively; 14 is the treadle for operating the upper electrode jaw connected thereto by a spring tension rod 15; 16 is the snap circuit closer connected to the treadle by the tripping rod 17 and tripper 18; and 19 is the switch board.

On the table 20 on top of the frame in this example of my invention, I prefer to mount the electric brush 21, and operate the same by the same current as that supplying the electrodes.

Partly across the periphery and front of the brush case 22 I prefer to form guide slots 23 and 24 at the top and bottom of the case respectively, through which the end of the cotton band is passed by hand across the top and bottom of the brush respectively to clean the opposite faces of said end preparatory to welding.

The brush 21 not only serves this purpose when needed, but also serves when in working as a convenient means for rapidly vibrating the electrodes, when clamped on the overlapping ends to be welded, relatively to the ends, and the clamped overlapping ends relatively to each other. In practice I find that this rapid relative vibration so clears and cleans the ends that in nearly all cases an adequate electric contact is established between the electrodes and the ends, and a full current and perfect fusion is obtained without the usual preliminary cleaning.

I claim as my invention:

A spot welder comprising a frame, electrodes mounted thereon, means for clamping the electrodes on the superposed parts of the work, and means for vibrating the electrodes substantially so as to create frictional movement between the superposed parts of the work and thereby remove paint and other resisting matter from the contacting surfaces of the superposed parts.

In testimony whereof I affix my signature.

RICHARD H. PRATT.